Jan. 8, 1929.
S. C. HATFIELD
1,698,055
FELLY
Filed May 31, 1922
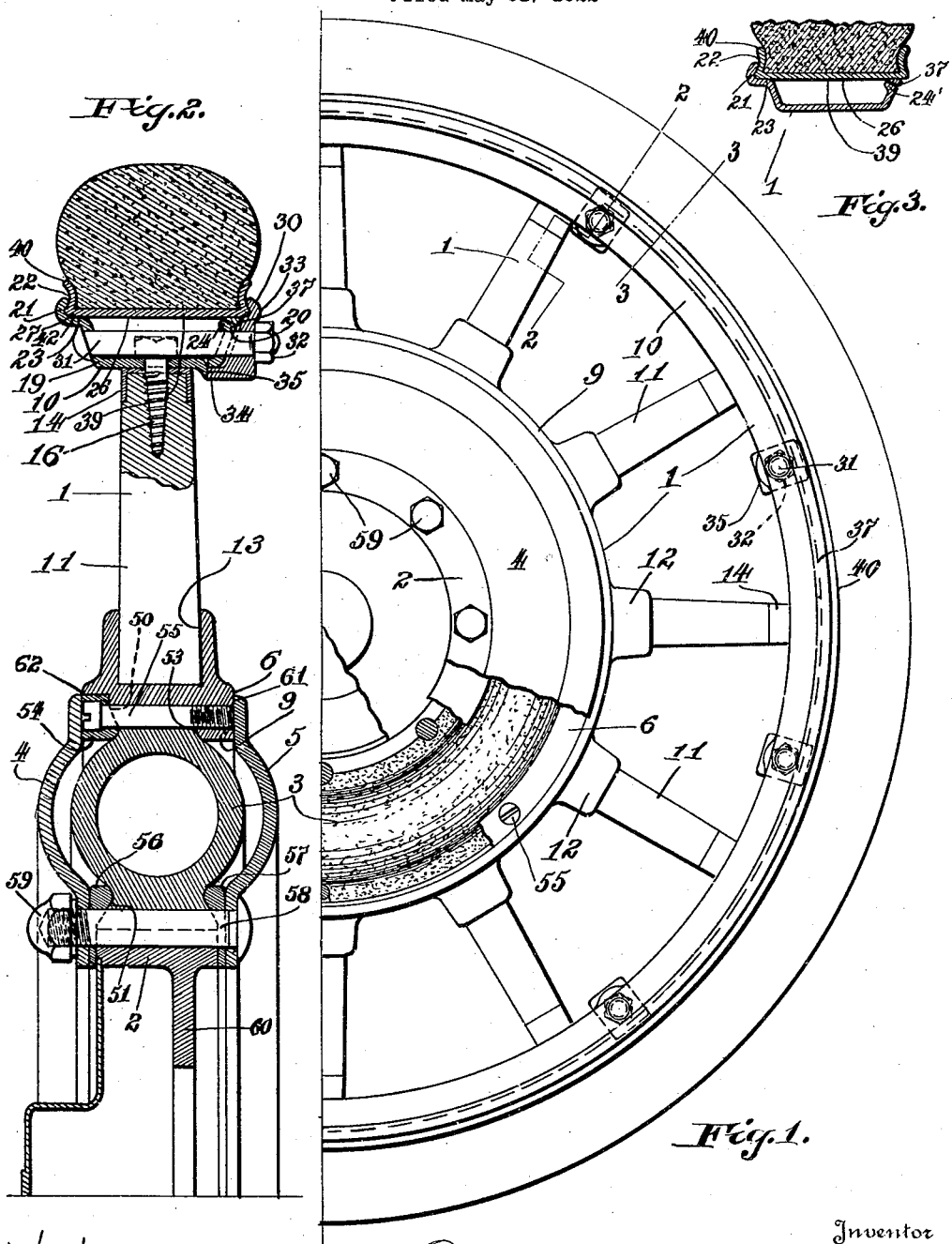

Patented Jan. 8, 1929.

1,698,055

UNITED STATES PATENT OFFICE.

SCHUYLER C. HATFIELD, OF BALTIMORE, MARYLAND.

FELLY.

Application filed May 31, 1922. Serial No. 564,891.

The invention relates to wheel structure particularly applicable to and therefore illustrated in connection with elastic wheels of the type which consists of an outer or spoke section, an inner or hub section, the two being mounted for relative radial motion and having a pneumatic pad mounted between the sections to supply the resilient element referred to.

The invention relates to a construction whereby wooden spokes are conveniently used with a metal felly resulting in a substantial structure of extremely long life and further providing for the convenient removal and replacement of the spokes at any time without difficulty.

The invention further relates to a felly construction and to the combination therewith of a type of demountable rim particularly adapted for use with a solid tire to which it is permanently secured.

The invention further relates to the manner of mounting the pneumatic pad and controlling the relative motion of the parts.

In the accompanying drawings I have illustrated a wheel applying the features of my invention in the preferred form.

In the drawings:

Figure 1 is a fragmentary side elevation of the wheel;

Figure 2 is a radial section on the line 2—2 of Figure 1;

Figure 3 is a section on the line 3—3 showing the rim and tire and felly.

Referring to the drawings by numerals the wheel consists of an outer or spoke section 1, and an inner or hub section 2, encircled by the outer section and spaced radially therefrom, and an annular pneumatic pad 3 between the sections. The radial spacing provides for relative motion between the sections and the pad 3 lends resiliency to this relative motion. The relative motion is controlled and confined to a radial plane, i. e., to the plane of rotation by annular flanges or plates 4—5 which are secured to the hub section 2 at their inner peripheries and bear at their outer peripheries on flat circular surfaces 6 near the inner peripheries of the outer of spoke section.

The outer or spoke section 1 consists of an inner ring 9, and a felly 10, the parts being braced and spaced by spokes 11. To this end the inner ring 9 is formed with outwardly disposed radially extending sockets 12 conveniently spaced along its periphery into which the bases 13 of the spokes are thrust. The spokes are enclosed at their outer ends by metal caps or rings 14 and each spoke is held in position by a screw bolt or lag screw 16 which passes inwardly through the felly 10 which is constructed of channel shaped cross-section, the bolt passing through the bottom of the channel and into the end of the spoke in the direction of its axis, the cap 14 being suitably apertured to admit and receive the bolt.

With this construction if one or more spokes should fail or be broken in any way the felly can be removed by first taking out the bolts 16 the defective spokes can be pulled out and new ones substituted therefor by inserting one end in the sockets 12, the cap having been passed over the other end and inserting the screw 16 through the felly, it being understood that the felly is removed by taking out all the screws 16 and replaced when the spokes have been replaced.

The felly and rim construction are of great importance. The felly as aforesaid is in the form of a channel having its sides 19—20 extending outward in the general direction of the radius. The sides are preferably inclined, diverging outwardly toward the periphery so the channel is widest at the top, i. e., toward the periphery. One side, preferably the outer side 19, is formed with an edge bead 21 which is hooked to receive the edge 22 of the rim, to be described.

Below or inward from the hook the felly is provided with a peripherally extending shoulder 23 against which a peripheral edge or rather zone of the inner face of the rim 39 adjacent the edge, is seated, the face being indicated by reference character 26 and the zone by reference character 27. The opposite edge of the felly is shouldered at 24 but there is no hook on this side. Lugs 30 cooperate with the hook bead 21, these lugs which are spaced at suitable intervals along the rim are held by bolts 31 passing through the felly parallel to the axis of the wheel and nuts 32 thereon. The lugs 30 are apertured to admit the bolts 31 and each is provided with a hook 33 at one end and a foot 34 at the other end, the felly being punched out at intervals corresponding to the spacing of the lugs to provide shoulders or seats 35 for the feet 34 of the lugs. The rim is further wedged and held in position by a locking ring 37 which as shown is wedge shaped in cross-section, being shaped to enter a correspondingly wedge shaped cavity between the shoulder 24 and the inner peripheral surface of the ring. The shoulder 24 being inclined for this purpose.

The rim proper as foresaid is preferably a channel shaped member 39 having two side walls 40 concave inwardly forming peripheral extending edge beads 42 to be engaged by the hook or hooks 21 or hooked flange at one side of the felly and the hooks 30 on the lugs at the other side.

The rim thus constructed is conveniently demountable and the felly and rim are particularly adapted for use with a solid tire because there is little or no tendency to expand the rim as is the case with the rim lugs in general use on pneumatic tires, the tendency to expand the rim being objectionable with solid tires because there is less tension of the tire tending to contract the rim with the solid tire than there is with a pneumatic tire which latter when inflated applies a strong peripheral tension, tending to draw the rim inward and contract it.

In the present instance there is a continuous support for the rim on both sides, i. e. shoulder 23 and ring 24, and the "inclined" sides of the felly band, compel it to assume, or try to assume a larger outside diameter, when the bolts 31 are tightened, thus automatically providing sufficient expansion to take care of any increase of size in metal rim by usage.

The resilient feature has been described as comprising inner and outer sections 1 and 2 or spoke and hub sections mounted to move relatively to each other in a radial direction, means for confining the motion to a radial plane and resilient member or pad 3 between the relatively moving members. The resilient member 3 has an outer peripheral bead 50 and an inner peripheral bead 51. The outer peripheral bead is secured to the inner rim 9 of the spoke section by means of a rabbet or circularly extending shoulder 53 on one side and a locking ring 54 on the other side, the latter being held in position by screw bolts 55 which pass through the ring 54 and the shoulder 53. The inner bead 51 is secured to the hub section in the present instance by two locking rings 56 and 57, one on each side bearing against the opposite faces of the hub section and further secured by bolts 58 which hold the ring plates 4 and 5 also passing through the rings 56 and 57. Preferably both of the beads on the pad are tapered, increasing in width outwardly and the locking rings and the rabbet 53 are oppositely tapered to cooperate therewith, the flange 60 is to be secured to the hub flange proper in any preferred manner as by means of bolts which draw the two hub flanges together in holding the ordinary wooden spokes. The plates 4 and 5 guide the parts in their relative motion bearing on plane circular surfaces 61, 62 on each side of the ring 9.

The operation, i. e., the manner of setting up and taking down will be easily apparent from the description, the two parts of the wheel, i. e., the spoke and hub section may be separated by removing the nuts 59 from the bolts 58 and taking off one or both of the plates 4, 5, first deflating the pad which is preferably pneumatic, i. e., inflated and releasing it by loosening and removing the locking ring or rings from one or both sections. The manner of removing and replacing the spokes has already been described.

The operation of removing and replacing the rim and tire is the ordinary operation incident to changing a demountable rim. This operation is so infrequently performed that it is feasible to place the nuts 32 on the inside instead of on the outside.

I have thus described specifically and in detail a wheel involving the various features of my invention, however, the specific terms herein are used descriptively rather than in a limiting sense, the scope of the invention bing defined in the claims.

What I claim and desire to secure by Letters Patent is:

1. A wheel having a sheet metal felly, the sheet metal being formed into a hook and supporting shoulder at one side, a supporting shoulder on the other side forming a channel-shaped member and removable hooks in the form of rim lugs co-operating with the aforesaid hook on the felly, a rim having inner edge beads to be engaged by the hook on the felly and the lug hooks.

2. A wheel having a sheet metal felly, the sheet metal being formed into a hook and supporting shoulder at one side, a supporting shoulder on the other side and removable hooks in the form of rim lugs co-operating with the aforesaid hook flanges and a rim having concave sides forming inner edge beads to be engaged by hook flanges and lug hooks.

3. A sheet metal felly having a peripherally extending hook flange on one side, a rim supporting shoulder adjacent the flange, a rim supporting shoulder on the other side, a series of lug foot supports spaced inward from the shoulder, hooked lugs opposite the foot supports and with the hook flange and means for securing the lugs in position, a rim co-operating therewith having concave sides forming an inner edge bead to be engaged by side hook flange and hook lugs.

4. A wheel having a sheet metal felly, the sheet metal being formed into a hook and supporting shoulder at one side, a supporting shoulder on the other side and removable hooks in the form of rim lugs co-operating with the aforesaid hook flange and a rim having concave sides forming inner edge beads to be engaged by the hooked flange and lug hooks.

5. A sheet metal felly having a peripherally extending hook flange on one side, a rim supporting shoulder adjacent the flange, a rim supporting shoulder on the other side, a series of lug foot supports spaced inward from the shoulder, hooked lugs co-operating with the foot supports and with the hook flange and means for securing the lugs in position, a rim with a solid tire permanently attached thereto, the rim having concave sides forming inner edge beads to be engaged by said hook flange and hooked lugs.

6. A felly having a hook flange and supporting shoulder at one edge, an inclined supporting shoulder at the other edge, a wedge shaped locking ring adapted to co-operate with the inclined shoulder, hooked lugs also co-operating with the shoulder and the wedge ring, the felly having lug supporting bases spaced from the shoulder, a rim having concave side surfaces forming inner edge beads to cooperate with the hook flange, hook lugs, supporting shoulders and locking ring and means for drawing the lugs toward the hook flange forcing the locking ring home and clamping the rim to the felly.

Signed by me at Baltimore, Maryland, this 20th day of May, 1922.

SCHUYLER C. HATFIELD.